J. O. FJARLI.
GANG PLOW.
APPLICATION FILED AUG. 25, 1911.
Reissued Nov. 23, 1915.
14,017.
4 SHEETS—SHEET 1.
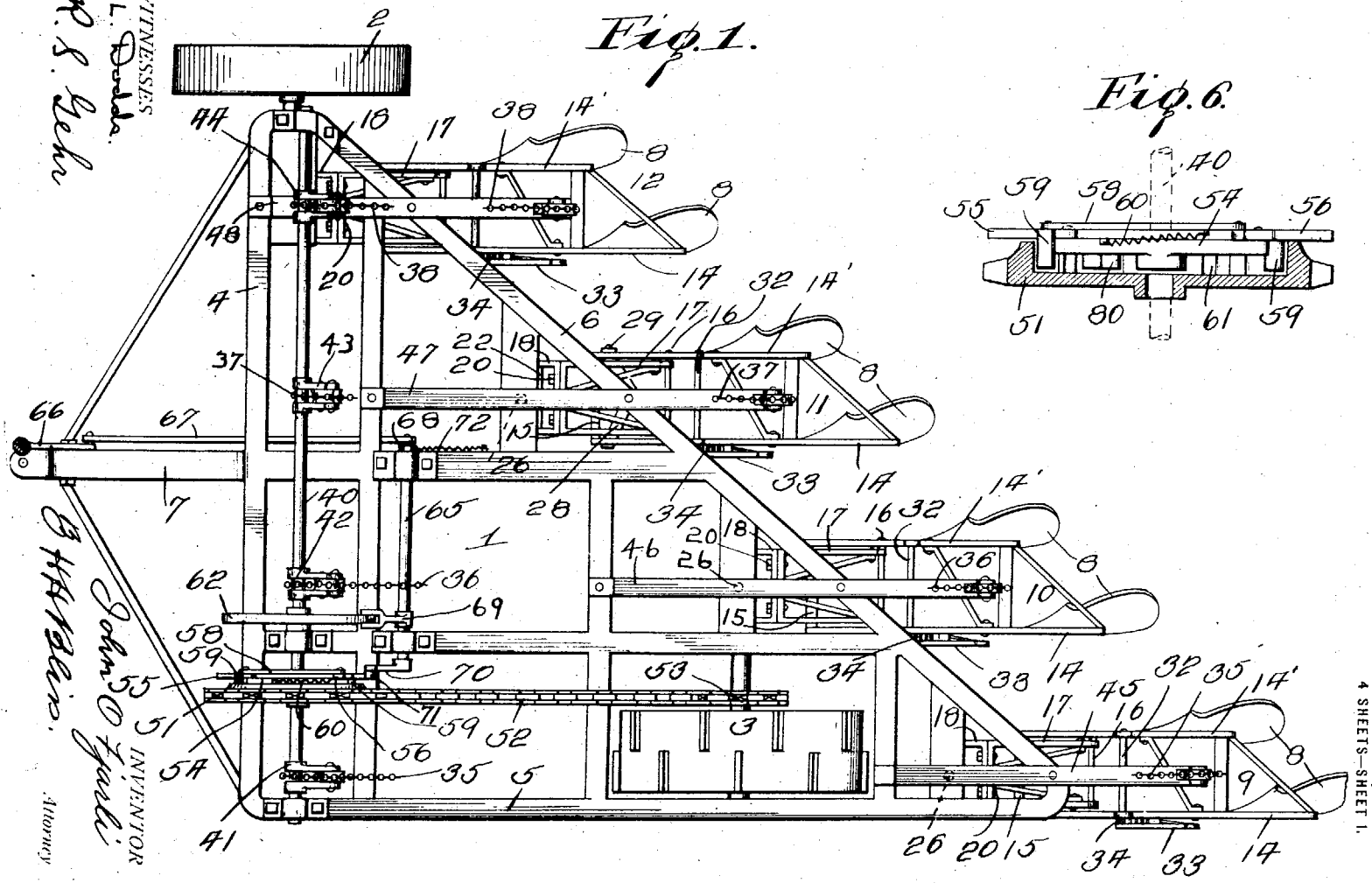
WITNESSES
F. L. Dodds.
R. S. Gehr
INVENTOR
John O. Fjarli
B. H. H. Bliss.
Attorney J. O. FJARLI.
GANG PLOW.
APPLICATION FILED AUG. 25, 1911.
Reissued Nov. 23, 1915.
14,017.
4 SHEETS—SHEET 2.
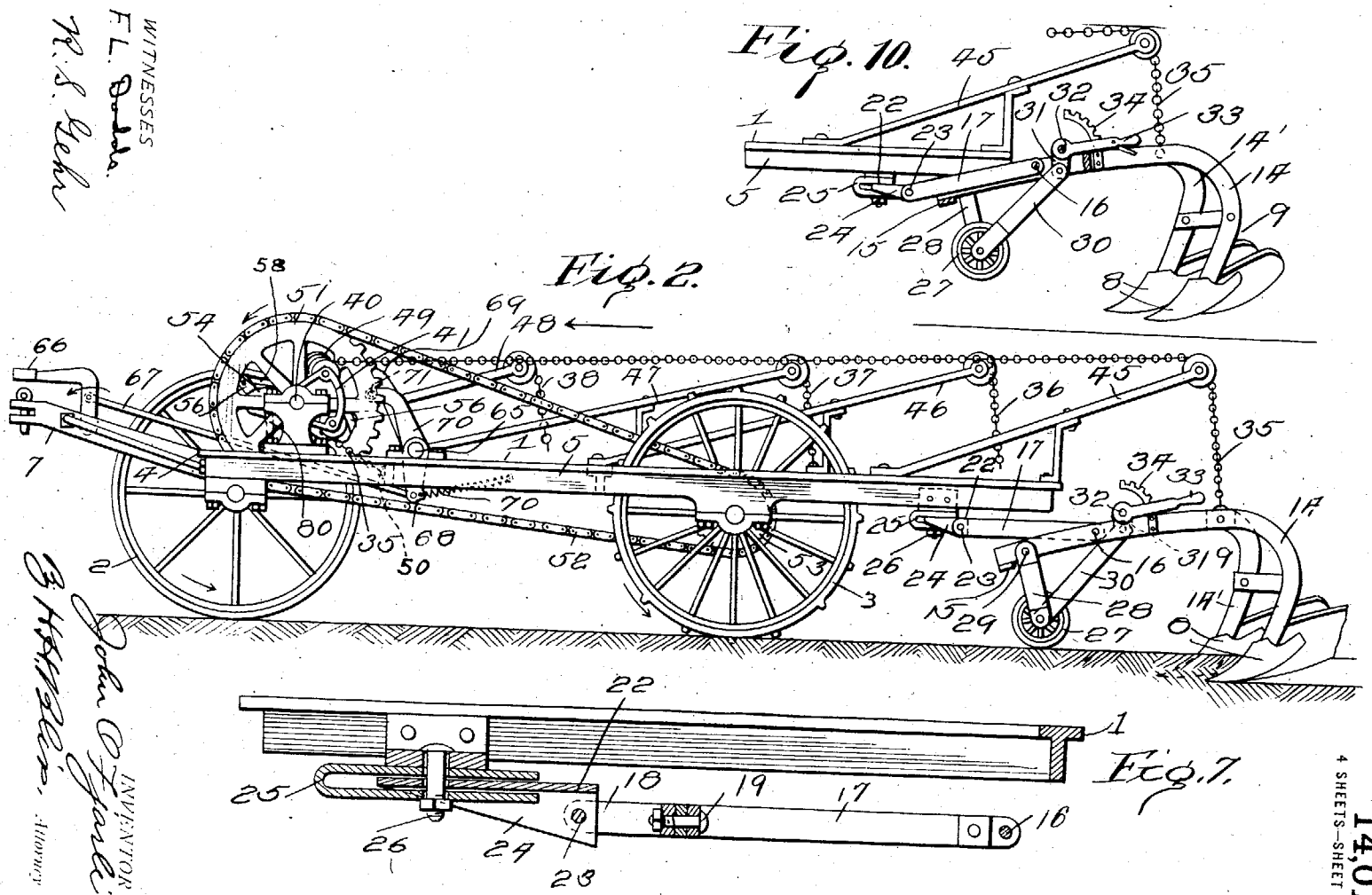
WITNESSES
F. L. Dodds.
R. S. Gehr
INVENTOR
John O. Fjarli
By H. H. Blair, Attorney J. O. FJARLI.
GANG PLOW.
APPLICATION FILED AUG. 25, 1911.
Reissued Nov. 23, 1915.
14,017.
4 SHEETS—SHEET 3.
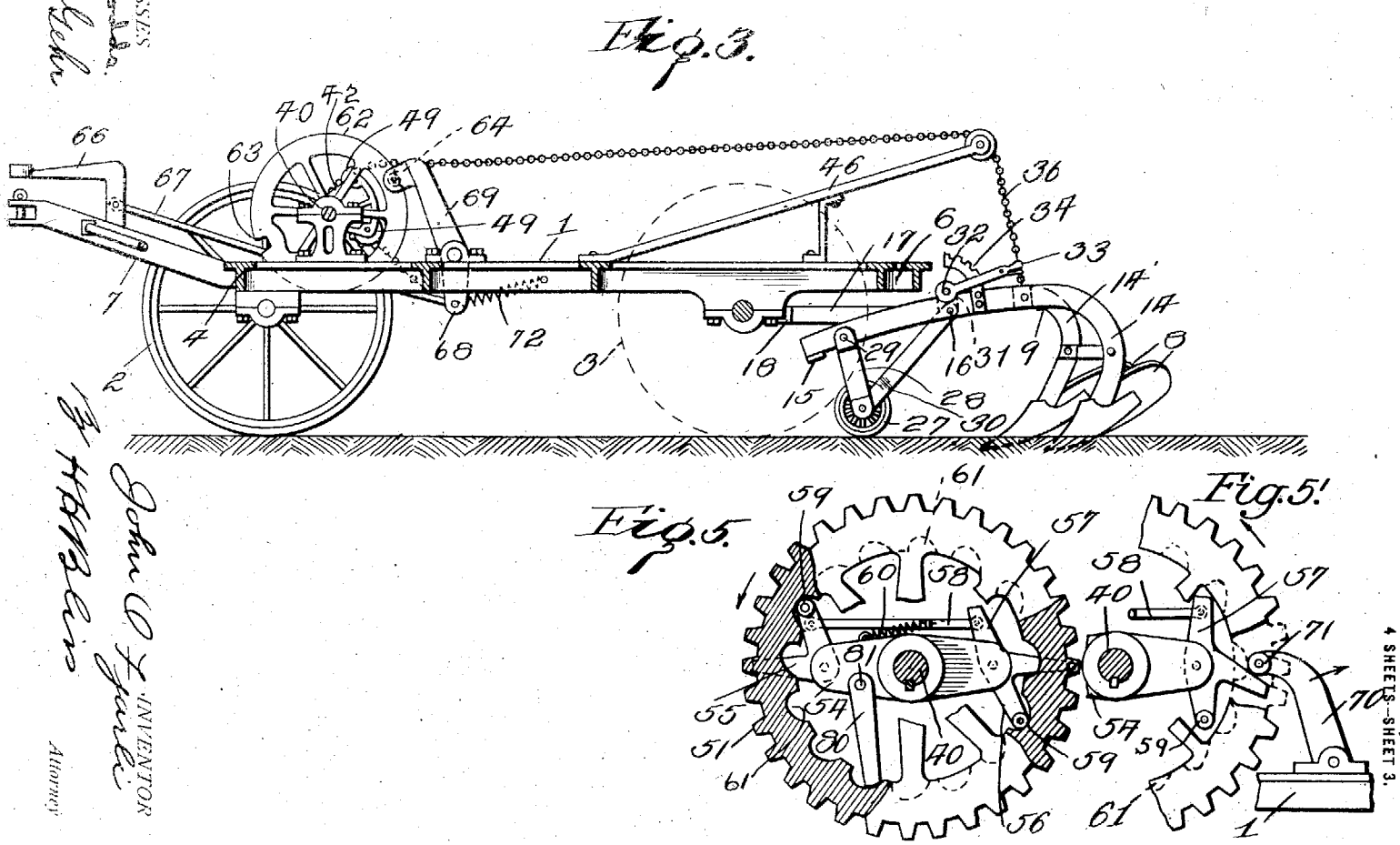
WITNESSES
F. L. Dodds.
R. S. Gehr
John O. Fjarli INVENTOR
By H. H. Bliss
Attorney J. O. FJARLI.
GANG PLOW.
APPLICATION FILED AUG. 25, 1911.
Reissued Nov. 23, 1915.
14,017.
4 SHEETS—SHEET 4.
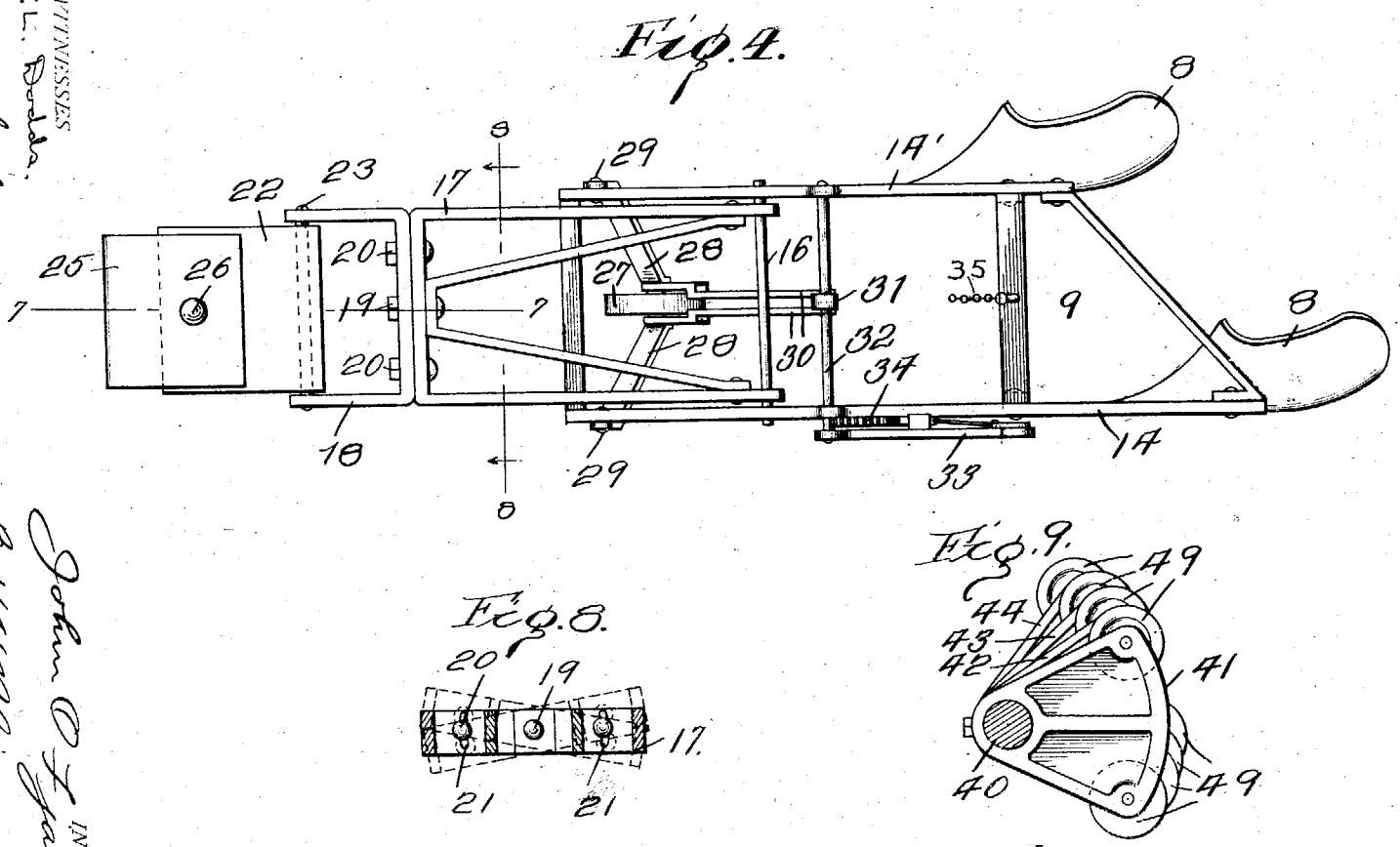
WITNESSES
F. L. Dodds.
R. S. Gehr
INVENTOR
John O. Fjarli
By H. H. Bliss.
Attorney

UNITED STATES PATENT OFFICE.

JOHN O. FJARLI, OF BERWICK, NORTH DAKOTA, ASSIGNOR TO J. B. BARTHOLOMEW, OF PEORIA, ILLINOIS.

GANG-PLOW.

14,017. Specification of Reissued Letters Patent. Reissued Nov. 23, 1915.

Original No. 936,768, dated October 12, 1909, Serial No. 441,604. Application for reissue filed August 25, 1911. Serial No. 646,073.

*To all whom it may concern:*

Be it known that I, JOHN O. FJARLI, a citizen of the United States, residing at Berwick, in the county of McHenry and State of North Dakota, have invented certain new and useful Improvements in Gang-Plows, of which the following is a specification.

This invention relates to certain new and useful improvements in gang plows, such as are drawn by traction or other power vehicles, or are operated by self contained power.

The main object of the invention is to provide means for raising the plows out of the soil and for lowering the same into the soil at will through means operated from the traction wheel of the plow.

Another object of the invention is to so time the raising and lowering of the plows of a series relatively that the furrows cut will begin and end at the same point.

The above and other characteristic features of the invention are fully illustrated in the accompanying drawings forming a part of this specification and wherein like numerals of reference designate corresponding parts throughout the several views in which:

Figure 1 is a top plan view. Fig. 2 is a side elevation thereof. Fig. 3 is a vertical longitudinal section. Fig. 4 is a top plan view of one of the plow frames. Fig. 5 is a detached elevation of the clutch device partly broken away in section. Fig. 5′ is a similar view showing the parts in another position. Fig. 6 is a horizontal sectional view through Fig. 5. Fig. 7 is a vertical sectional view through portions of the vehicle frame and one of the plow frames. Fig. 8 is a sectional view showing the swivel connnection for the plow frames, taken on line 8—8 of Fig. 4. Fig. 9 is a side elevation of the segments for operating the plow frame raising and lowering chains. Fig. 10 is a side elevation, partly in section showing the position of the plows and their supporting frames lifted from the ground.

Reference numeral 1 designates the vehicle frame, 2 one of the traction wheels therefor, and 3 the other traction wheel from which the plow raising and lowering mechanism is operated. The front bar 4 and side bar 5 of the said vehicle frame are at right angles to each other and are connected by diagonal bar 6 which forms the rear end of the triangular frame so formed. The tongue or draw-bar 7 which extends longitudinally through the center of the vehicle frame is provided at its front end with any suitable coupling for attachment to a traction engine or other agricultural machine; though it will be understood that the motive power may be self contained either to drive the whole machine or only the plow raising and lowering mechanism. The plow blades 8 are mounted in duplicate on opposite sides of the rear ends of plow frames 9, 10, 11 and 12. These plow frames are alike and the one designated by numeral 9 is selected for detail description.

The plow frames, as seen in Fig. 4, consist of side bars 14, 14′ to which the plow blades 8 are secured, and the front ends of these side-bars are connected by a cross-bar 15. Between the ends of the side-bars 14, 14′ the said bars are connected by a pivot rod 16 which extends through the rear ends of a swivel-frame 17 thereby pivotally supporting the plow frame. The swivel frame 17 is swiveled to a clevis-shaped member 18 by bolt 19, and movement of the said parts is limited by bolts or pins 20 (see Fig. 8) in curved slots 21 formed in the swivel frame 17. At its forward end the clevis-shaped frame 18 is swingingly connected for vertical movement to a plate 22 by means of a bolt 23 passing through side flanges 24 (see Fig. 7) of the plate. This plate in turn is secured for horizontal swinging movement by being secured between the folds of a substantially U-shaped member 25 by means of king bolt 26, and the said member 25 is rigidly attached in any desired manner to the vehicle frame 1. Thus it will be seen that the plow frames are capable of numerous and practically universal movements to compensate for any irregularities in the ground or movement of the vehicle. A gage wheel 27 depends from brackets 28 pivoted to the forward end of the plow frame at 29, and said gage wheel may be adjusted to vary the cut of the plow blades through the medium of links 30 and crank arm 31 of shaft 32, which shaft 32 is operated by hand lever 33 capable of being locked in adjusted position by ratchet and segment 34.

During the operation of plowing the plow-frame parts assume the position illustrated in Fig. 2, *i. e.* with the plow blades entering the ground and the gage wheel rolling over the surface of the uncut soil and the front end of the plow frame tilted downward. When the plows are lifted out of the soil, the plow frame parts assume the positions illustracted in Fig. 10. The raising and lowering of the plow frames are accomplished by chains 35, 36, 37 and 38, attached to the plow frames between the ends thereof and to operating mechanism to be hereinafter described.

The operating chain 35 as seen in Fig. 10 is attached to the plow frame 9 so that the greater weight will be in the rear of the point of attachment, whereby, when the plow frame is lifted by the chain, the greater weight of the plow blade end will cause the forward end of the frame to be drawn upwardly until the said cross bar 15 contacts with the swivel frame 17 when the said swivel frame 17 will be moved upwardly and swung on its pivot 23. By this construction, it will be seen that the tendency will be for the forward or point ends of the plow to leave the ground first.

On the forward end of the vehicle frame is journaled a transverse shaft 40, provided at equidistant points in line with the plow frames with roller segments 41, 42, 43 and 44. The raising and lowering chains 35, 36, 37 and 38 for the plow frames pass over roller brackets 45, 46, 47 and 48 to the said roller segments 41, 42, 43 and 44 respectively. The segment 41 to which the other segments 42, 43, and 44 are similar, is substantially a lever arm and is provided with corner rollers 49 over which the chain 35 passes to a point where the said chain is attached to the vehicle frame, as designated by numeral 50 in Fig. 2, and the same is true regarding the other chains and segments.

At a suitable point on the shaft 40 is arranged a loose gear wheel 51, illustrated as being operated by sprocket chain 52 from sprocket wheel 53 on the axle of the traction wheel 3, though a suitable motor may be mounted on the frame of the machine for continuously rotating the gear or sprocket wheel 51.

Keyed to the shaft 40 (see Fig. 5) is a casting 54 comprising two diametrically disposed radial arms, to the outer end of one of which is pivoted a bell-crank ratchet lever or arm 55 and to the other arm is pivoted another bell-crank ratchet lever or arm 56 having an extension 57 to which and one arm portion of the ratchet lever 55 is pivotally attached a link 58 by means of which both bell-crank ratchet levers or arms 55 and 56 are caused to move together. One portion of each of said levers 55 and 56 is provided with a friction roller 59 and these roller ends are normally placed or forced by springs 60 into the ratchet notches 61 formed in the inner face of the rim of the said gear or sprocket wheel 51.

Keyed to the shaft 40 is a lock disk 62 formed with diametrically opposite lock notches 63 and 64 as illustrated in Fig. 3. Journaled in the vehicle frame and parallel with shaft 40 is a rock shaft 65 which is operated from a foot lever 66 by means of link 67 and crank arm 68. This rock shaft is provided with stop-arm 69 adapted to engage in notches 63 and 64 of lock disk 62, and also provided with trip arm 70 having a roller end 71 arranged in the path of the bell crank ratchet levers 55 and 56 and both arms 62 and 70 are normally held against lock disk 62 and in path of said ratchet arms respectively by means of the spring 72 shown in Figs. 2 and 3.

Owing to the diagonal arrangement of the gangs it will be apparent that if all were lifted or lowered into the ground at the same time, the furrows would not begin or stop at the same point, hence the segmental lifting arms 41, 42, 43 and 44 are set or keyed on the shaft at different relative points as illustrated in Fig. 9, so that the plow blades on plow frame 12 will leave the soil first and the other follow successively in lifting; and in lowering, the said same plow frame 12 will be lowered first and the others will follow successively.

The operation is as follows: As the plow vehicle moves over the ground, power is transmitted through sprocket chain 52 to the main sprocket wheel 51 which loosely turns on the shaft 40 in the direction of the arrow in Figs. 5 and 5′. The shaft 40 is prevented from turning by the lock arm 69 engaging in one of the notches 63, 64 of the lock disk 62. The trip arm 70 being also keyed on the rock shaft 65 has its roller end 71 in the path of the ratchet or clutch levers 55, 56, so as to swing said ratchet levers on their pivots to disengage the roller ends 59 thereof from the ratchet notches 61. In Fig. 5′, the trip arm 70 is illustrated as being in engagement with the ratchet lever 56 and pressing the roller end 59 thereof out of the notches 61 and as the other ratchet lever 55 is linked with said ratchet lever 56 both rollers 59 are out of the notches and the sprocket wheel 51 is permitted to turn independently of the shaft 40. The plow blades being in the ground as illustrated in Figs. 2 and 3 and it being desired to raise the same, the operator depresses foot lever 66 and through the agency of link 67 the lock lever 69 is withdrawn from the notch in the lock disk 62 and the trip lever 70 (Fig. 5′) simultaneously moved in the direction of the arrow to disengage the ratchet lever. As the said ratchet lever 56 is disengaged, the spring 60 and link 58 will cause the rollers 59 to enter the ratchet notches 61 and thereby cause the shaft 40 to turn with the sprocket wheel 51. The foot lever now being released, the spring 72 (Fig. 3) will return the lock arm 69 and trip lever 70 to their initial positions. After the sprocket wheel 51, lock disk 62 and shaft 40 have turned one-half revolution, the lock arm 69 will fall into the other notch 63 in the lock disk 62 and the trip arm 70 will engage the other ratchet lever 55 to withdraw the rollers 59 from engagement with the ratchet notches 61 and permit the main sprocket wheel 51 to again rotate loosely and independently on the shaft 40 until the foot lever is again depressed to lock the shaft 40 to turn another half revolution with the sprocket wheel 51. As the shaft 40 turns the half revolution first described, the segmental lifting arms 41, 42, 43 and 44 will successively tighten and draw in their respective chains 35, 36, 37 and 38 to successively lift the plow frames and their plow blades from their lowered or plowing positions. As the shaft 40 makes the other half revolution, which it will of course be understood is only made at the will of the operator upon depression of the foot lever 66, the lifting segments or arms will be returned to their first positions thereby paying out the chains and successively lowering the plow frames and blades to their plowing positions. During the lowering of the plow frames a safety pawl 80 pivoted to the casting 54 at 81 will fall into one of the notches 61 in the trip wheel 51 and prevent the shaft 40 and trip parts from moving faster in the direction of the arrow in Fig. 5 than the movement of the sprocket or trip wheel, which would be the case due to the great weight of the plows and tension on the chains were the said safety pawl 80 not provided.

What I claim is:—

1. The combination with a vehicle frame, and plows carried thereby, of a shaft on the said frame, means on said shaft for raising the plows on one half revolution of the shaft and for lowering the plows on the other half revolution of the shaft, and means for locking the shaft against rotation on every half revolution thereof.

2. The combination with a vehicle frame, and plows carried thereby, of a shaft on the said frame, means on said shaft for raising the plows on one half revolution of the shaft and for lowering the plows on the other half revolution of the shaft, and means for automatically locking the shaft against rotation on every half revolution thereof.

3. The combination with a vehicle frame and plows carried thereby, of a shaft on the said frame, means on said shaft for raising the plows on a half revolution of the shaft and for lowering the plows on the other half revolution of the shaft, a disk or wheel on the shaft, and means adapted to automatically engage the disk at diametrically opposite points to lock the shaft against rotation on every half revolution thereof.

4. The combination with a vehicle frame and plows carried thereby, of a shaft on the said frame, means on said shaft for raising the plows on a half revolution of the shaft and for lowering the plows on the other half revolution of the shaft, a disk provided with diametrically opposite stops, and means adapted to come into engagement with said stops to lock the shaft against rotation on every half revolution of the latter.

5. The combination with a vehicle and plows carried thereby, of a shaft, means on the shaft for raising the plows during one half revolution and for lowering the plows during the other half revolution of the shaft, a normally rotating element, means connecting the shaft with said element, and means for automatically disconnecting the shaft from said element on every half revolution of the shaft.

6. The combination with a vehicle and plows carried thereby, of a shaft, means on the shaft for raising the plows during one half revolution and for lowering the plows during the other half revolution of the shaft, a continuously rotating element, means connecting the shaft with said element, means for bringing the shaft to a full stop on every half revolution, and means for locking the shaft on every half revolution.

7. In a device of the character described, the combination with a vehicle and plows, of a continuously rotating element, a shaft, means operated by the shaft to raise and lower the plows, a ratchet lever pivotally connected with the shaft and being adapted to interlock with the said element, a trip device adapted to engage the ratchet lever to disengage the same from said element, and means for engaging said ratchet lever with the said element when the ratchet lever is released by the said trip lever to cause the shaft to rotate with said element.

8. In a device of the character described, the combination with a vehicle and plows, of a continuously rotating element, a shaft adapted to be coupled and uncoupled with the said element, means operated by the shaft to raise and lower the plows, oppositely disposed ratchet levers carried by the shaft, a trip device adapted to engage the ratchet levers, successively to disengage the same from said element on every half revolution of the shaft, and means for placing said ratchet levers in engagement with said element when one of the ratchet levers is released by the said trip lever to cause the shaft to rotate with said element.

9. In a device of the character described, the combination with a vehicle and a diagonal series of plows carried thereby, of a rigid shaft rotatably mounted on the vehicle, a series of crank arms on the shaft, connections between the crank arms and the plows for raising and lowering the latter, said crank arms being set in such angular relation as to successively raise and lower the plows when the shaft is turned.

10. In a device of the character described, the combination with a vehicle and a diagonal series of plows connected thereto, of a rigid shaft rotatably mounted on the vehicle, and means carried by the shaft for alternately lifting and lowering the plows in automatically timed successive relation to each other when the shaft is turned.

11. In a device of the character described, the combination with a vehicle and a diagonal series of plows connected thereto, of a rigid shaft rotatably mounted on the vehicle, and means comprising a series of crank arms mounted in angularly spaced relation to each other on said shaft for lifting and lowering the plows in succession.

12. In a device of the character described, the combination with a vehicle and a diagonally arranged series of plows connected thereto, of a rigid shaft rotatably mounted on the vehicle, a series of crank arms mounted in angularly spaced relation on the shaft, and a series of flexible members each secured at one end to the vehicle frame, passing thence over one of the crank arms and secured at its other end to one of the plows, the arrangement being such as to successively lift the plows when the shaft is rotated.

13. In a device of the character described, the combination with a vehicle and a series of plows connected thereto, of a continuously rotating element, a second element rotatively mounted on the vehicle, means operated by said second element to raise and lower the plows, a ratchet lever connected to one of said elements and adapted to interlock with the other element, a trip device adapted to automatically disengage the ratchet lever from the element with which it interlocks, and means for causing the engagement of the ratchet lever with said element when the ratchet lever is released by the trip device.

14. In a device of the character described, the combination with a vehicle and a diagonal series of plows connected thereto, mechanism for lifting the plows successively, means for driving said mechanism, connections between said mechanism and driving means that are normally disengaged, means comprising a lever adapted in its normal position to cause disengagement and when moved from said position to cause engagement of said connections, and means for automatically returning the lever, when moved, to its normal position.

15. In a device of the character described, the combination with a vehicle and a diagonal series of plows connected thereto, of mechanism for successively lifting the plows, a control lever adapted, when moved in one direction, to cause the actuation of the lifting mechanism, and means for automatically returning said lever to its initial position.

16. In a device of the character described, the combination with a vehicle and a diagonal series of plows connected thereto, of mechanism for lifting the plows successively, means for driving said mechanism, manually controlled means for connecting the driving means to the lifting mechanism, and means actuated independently of said driving means for automatically positively disengaging the driving means from the lifting mechanism when the plows have been lifted.

17. In a plow, the combination of a frame, a wheel on which the frame is mounted, a plow connected to the frame, a hoisting mechanism mounted on the frame and connected to the plow, and means actuated by the wheel to operate the hoisting mechanism, including a shaft and gearing between the shaft and the wheel provided with a tripping device manually operated to operatively engage the gearing and automatically operated to disengage the same.

18. In a device of the character described, the combination with a vehicle comprising one or more ground wheels, and a series of plows connected to said vehicle, of manually controlled mechanism driven from one of the ground wheels for lifting the plows, said plows being adapted to be lowered by gravity, and means controlled by the movement of the driving ground wheel for causing the gradual lowering of the plows.

JOHN O. FJARLI.

Witnesses:
A. J. BLIYEN,
ALBIN NYSTROM.

Copies of this patent may be obtained for five cents each, by addressing the "Commissioner of Patents, Washington, D. C."